US010289999B2

(12) United States Patent
Gauthier et al.

(10) Patent No.: US 10,289,999 B2
(45) Date of Patent: *May 14, 2019

(54) SYSTEM AND METHOD FOR SECURED ACCOUNT NUMBERS IN PROXIMITY DEVICES

(71) Applicant: Visa U.S.A. Inc., San Francisco, CA (US)

(72) Inventors: Patrick Gauthier, Mountain View, CA (US); Brian Maw, Belmont, CA (US); Patrick Faith, Pleasanton, CA (US); Barbara Patterson, South San Francisco, CA (US)

(73) Assignee: Visa U.S.A. Inc., San Francisco, CA (US)

( * ) Notice: Subject to any disclaimer, the term of this patent is extended or adjusted under 35 U.S.C. 154(b) by 1154 days.

This patent is subject to a terminal disclaimer.

(21) Appl. No.: 14/275,718

(22) Filed: May 12, 2014

(65) Prior Publication Data
US 2014/0249945 A1 Sep. 4, 2014

Related U.S. Application Data

(62) Division of application No. 11/398,887, filed on Apr. 5, 2006, now Pat. No. 8,762,263.
(Continued)

(51) Int. Cl.
G06Q 40/00 (2012.01)
G06Q 20/38 (2012.01)
(Continued)

(52) U.S. Cl.
CPC ......... *G06Q 20/385* (2013.01); *G06Q 20/204* (2013.01); *G06Q 20/24* (2013.01);
(Continued)

(58) Field of Classification Search
CPC ..................................................... G06F 9/4443
(Continued)

(56) References Cited

U.S. PATENT DOCUMENTS 3,594,727 A 7/1971 Braun
5,163,098 A 11/1992 Dahbura
(Continued)

FOREIGN PATENT DOCUMENTS

CN 1549977 A 11/2004
EP 1028401 A2 8/2000
(Continued)

OTHER PUBLICATIONS

Petition for Inter Partes Review of U.S. Pat. No. 8,533,860 Challenging Claims 1-30 Under 35 U.S.C. § 312 and 37 C.F.R. § 42.104, filed Feb. 17, 2016, Before the USPTO Patent Trial and Appeal Board, IPR 2016-00600, 65 pages.
(Continued)

*Primary Examiner* — Bennett M Sigmond
*Assistant Examiner* — Michael D Cranford
(74) *Attorney, Agent, or Firm* — Kilpatrick Townsend & Stockton LLP

(57) ABSTRACT

A method and system for using a secured account number for processing proximity types of wireless financial transactions associated with portable consumer proximity devices is disclosed. In one embodiment, the method includes receiving a proximity type of wireless financial transaction request along with a secured account number from a portable proximity consumer device such as a contactless smart card, converting the secured account number to the user's real account number, and transmitting the financial transaction request along with the user's real account number to the issuer of the user's real account number for authorization and processing.

20 Claims, 4 Drawing Sheets

Related U.S. Application Data

(60) Provisional application No. 60/714,635, filed on Sep. 6, 2005.

(51) Int. Cl.

| | | |
|---|---|---|
| *G06Q 20/24* | (2012.01) | |
| *G06Q 20/32* | (2012.01) | |
| *G06Q 20/40* | (2012.01) | |
| *G06Q 40/02* | (2012.01) | |
| *G06Q 20/20* | (2012.01) | |
| *G06Q 20/34* | (2012.01) | |

(52) U.S. Cl.
CPC ......... *G06Q 20/327* (2013.01); *G06Q 20/352* (2013.01); *G06Q 20/40* (2013.01); *G06Q 40/02* (2013.01)

(58) Field of Classification Search
USPC .......................................................... 705/39
See application file for complete search history.

(56) References Cited

U.S. PATENT DOCUMENTS

| | | | |
|---|---|---|---|
| 5,276,311 | A | 1/1994 | Hennige |
| 5,280,527 | A | 1/1994 | Gullman |
| 5,585,787 | A | 12/1996 | Wallerstein |
| 5,613,012 | A | 3/1997 | Hoffman et al. |
| 5,781,438 | A | 7/1998 | Lee et al. |
| 5,877,482 | A | 3/1999 | Reilly |
| 5,883,810 | A | 3/1999 | Franklin et al. |
| 5,930,767 | A | 7/1999 | Reber |
| 5,953,710 | A | 9/1999 | Fleming |
| 5,955,961 | A | 9/1999 | Wallerstein |
| 5,956,699 | A | 9/1999 | Wong et al. |
| 5,988,497 | A | 11/1999 | Wallace |
| 6,000,832 | A | 12/1999 | Franklin et al. |
| 6,014,635 | A | 1/2000 | Harris et al. |
| 6,024,286 | A | 2/2000 | Bradley et al. |
| 6,044,360 | A | 3/2000 | Picciallo |
| 6,076,073 | A | 6/2000 | Pieterse et al. |
| 6,163,771 | A | 12/2000 | Walker et al. |
| 6,227,447 | B1 | 5/2001 | Campisano |
| 6,236,981 | B1 | 5/2001 | Hill |
| 6,267,292 | B1 | 7/2001 | Walker et al. |
| 6,327,578 | B1 | 12/2001 | Linehan |
| 6,341,724 | B2 | 1/2002 | Campisano |
| 6,385,596 | B1 | 5/2002 | Wiser et al. |
| 6,422,462 | B1 | 7/2002 | Cohen |
| 6,425,523 | B1 | 7/2002 | Shem-Ur et al. |
| 6,453,301 | B1 | 9/2002 | Niwa |
| 6,592,044 | B1 | 7/2003 | Wong et al. |
| 6,636,833 | B1 | 10/2003 | Flitcroft et al. |
| 6,748,367 | B1 | 6/2004 | Lee |
| 6,805,287 | B2 | 10/2004 | Bishop et al. |
| 6,805,288 | B2 | 10/2004 | Routhenstein et al. |
| 6,857,566 | B2 | 2/2005 | Wankmueller |
| 6,879,965 | B2 | 4/2005 | Fung et al. |
| 6,891,953 | B1 | 5/2005 | DeMello et al. |
| 6,901,387 | B2 | 5/2005 | Wells et al. |
| 6,931,382 | B2 | 8/2005 | Laage et al. |
| 6,938,019 | B1 | 8/2005 | Uzo |
| 6,941,285 | B2 | 9/2005 | Sarcanin |
| 6,980,670 | B1 | 12/2005 | Hoffman et al. |
| 6,990,470 | B2 | 1/2006 | Hogan et al. |
| 6,991,157 | B2 | 1/2006 | Bishop et al. |
| 7,051,929 | B2 | 5/2006 | Li |
| 7,069,249 | B2 | 6/2006 | Stolfo et al. |
| 7,103,576 | B2 | 9/2006 | Mann, III et al. |
| 7,113,930 | B2 | 9/2006 | Eccles et al. |
| 7,136,835 | B1 | 11/2006 | Flitcroft et al. |
| 7,177,835 | B1 | 2/2007 | Walker et al. |
| 7,177,848 | B2 | 2/2007 | Hogan et al. |
| 7,194,437 | B1 | 3/2007 | Britto et al. |
| 7,209,561 | B1 | 4/2007 | Shankar et al. |
| 7,264,154 | B2 | 9/2007 | Harris |
| 7,280,975 | B1 | 10/2007 | Donner |
| 7,287,692 | B1 | 10/2007 | Patel et al. |
| 7,292,999 | B2 | 11/2007 | Hobson et al. |
| 7,350,230 | B2 | 3/2008 | Forrest |
| 7,353,382 | B2 | 4/2008 | Labrou et al. |
| 7,379,919 | B2 | 5/2008 | Hogan et al. |
| RE40,444 | E | 7/2008 | Linehan |
| 7,415,443 | B2 | 8/2008 | Hobson et al. |
| 7,444,676 | B1 | 10/2008 | Asghari-Kamrani et al. |
| 7,469,151 | B2 | 12/2008 | Khan et al. |
| 7,529,934 | B2 | 5/2009 | Fujisawa et al. |
| 7,548,889 | B2 | 6/2009 | Bhambri et al. |
| 7,567,934 | B2 | 7/2009 | Flitcroft et al. |
| 7,567,936 | B1 | 7/2009 | Peckover et al. |
| 7,571,139 | B1 | 8/2009 | Giordano et al. |
| 7,571,142 | B1 | 8/2009 | Flitcroft et al. |
| 7,580,898 | B2 | 8/2009 | Brown et al. |
| 7,584,153 | B2 | 9/2009 | Brown et al. |
| 7,593,896 | B1 | 9/2009 | Flitcroft et al. |
| 7,606,560 | B2 | 10/2009 | Labrou et al. |
| 7,627,531 | B2 | 12/2009 | Breck et al. |
| 7,627,895 | B2 | 12/2009 | Gifford et al. |
| 7,650,314 | B1 | 1/2010 | Saunders |
| 7,685,037 | B2 | 3/2010 | Reiners et al. |
| 7,702,578 | B2 | 4/2010 | Fung et al. |
| 7,707,120 | B2 | 4/2010 | Dominguez et al. |
| 7,712,655 | B2 | 5/2010 | Wong |
| 7,734,527 | B2 | 6/2010 | Uzo |
| 7,735,733 | B2 | 6/2010 | Kranzley |
| 7,753,265 | B2 | 7/2010 | Harris |
| 7,770,789 | B2 | 8/2010 | Oder, II et al. |
| 7,784,685 | B1 | 8/2010 | Hopkins, III |
| 7,793,851 | B2 | 9/2010 | Mullen |
| 7,801,826 | B2 | 9/2010 | Labrou et al. |
| 7,805,376 | B2 | 9/2010 | Smith |
| 7,805,378 | B2 | 9/2010 | Berardi et al. |
| 7,818,264 | B2 | 10/2010 | Hammad |
| 7,828,220 | B2 | 11/2010 | Mullen |
| 7,835,960 | B2 | 11/2010 | Breck et al. |
| 7,841,523 | B2 | 11/2010 | Oder, II et al. |
| 7,841,539 | B2 | 11/2010 | Hewton |
| 7,844,550 | B2 | 11/2010 | Walker et al. |
| 7,848,980 | B2 | 12/2010 | Carlson |
| 7,849,020 | B2 | 12/2010 | Johnson |
| 7,853,529 | B1 | 12/2010 | Walker et al. |
| 7,853,995 | B2 | 12/2010 | Chow et al. |
| 7,865,414 | B2 | 1/2011 | Fung et al. |
| 7,873,579 | B2 | 1/2011 | Hobson et al. |
| 7,873,580 | B2 | 1/2011 | Hobson et al. |
| 7,890,393 | B2 | 2/2011 | Talbert et al. |
| 7,891,563 | B2 | 2/2011 | Oder, II et al. |
| 7,896,238 | B2 | 3/2011 | Fein et al. |
| 7,908,216 | B1 | 3/2011 | Davis et al. |
| 7,922,082 | B2 | 4/2011 | Muscato |
| 7,931,195 | B2 | 4/2011 | Mullen |
| 7,938,318 | B2 | 5/2011 | Fein et al. |
| 7,954,705 | B2 | 6/2011 | Mullen |
| 7,959,076 | B1 | 6/2011 | Hopkins, III |
| 7,996,288 | B1 | 8/2011 | Stolfo |
| 8,025,223 | B2 | 9/2011 | Saunders et al. |
| 8,046,256 | B2 | 10/2011 | Chien et al. |
| 8,060,448 | B2 | 11/2011 | Jones |
| 8,060,449 | B2 | 11/2011 | Zhu |
| 8,074,877 | B2 | 12/2011 | Mullen et al. |
| 8,074,879 | B2 | 12/2011 | Harris |
| 8,082,210 | B2 | 12/2011 | Hansen |
| 8,095,113 | B2 | 1/2012 | Kean et al. |
| 8,104,679 | B2 | 1/2012 | Brown |
| RE43,157 | E | 2/2012 | Bishop et al. |
| 8,109,436 | B1 | 2/2012 | Hopkins, III |
| 8,121,942 | B2 | 2/2012 | Carlson et al. |
| 8,121,956 | B2 | 2/2012 | Carlson et al. |
| 8,126,449 | B2 | 2/2012 | Beenau et al. |
| 8,171,525 | B1 | 5/2012 | Pelly et al. |
| 8,196,813 | B2 | 6/2012 | Vadhri |
| 8,205,791 | B2 | 6/2012 | Randazza et al. |

(56) References Cited

U.S. PATENT DOCUMENTS

| | | |
|---|---|---|
| 8,219,489 B2 | 7/2012 | Patterson |
| 8,224,702 B2 | 7/2012 | Mengerink et al. |
| 8,225,385 B2 | 7/2012 | Chow et al. |
| 8,229,852 B2 | 7/2012 | Carlson |
| 8,265,993 B2 | 9/2012 | Chien et al. |
| 8,280,777 B2 | 10/2012 | Mengerink et al. |
| 8,281,991 B2 | 10/2012 | Wentker et al. |
| 8,328,095 B2 | 12/2012 | Oder, II et al. |
| 8,336,088 B2 | 12/2012 | Raj et al. |
| 8,346,666 B2 | 1/2013 | Lindelsee et al. |
| 8,376,225 B1 | 2/2013 | Hopkins, III |
| 8,380,177 B2 | 2/2013 | Laracey |
| 8,387,873 B2 | 3/2013 | Saunders et al. |
| 8,401,539 B2 | 3/2013 | Beenau et al. |
| 8,401,898 B2 | 3/2013 | Chien et al. |
| 8,402,555 B2 | 3/2013 | Grecia |
| 8,403,211 B2 | 3/2013 | Brooks et al. |
| 8,412,623 B2 | 4/2013 | Moon et al. |
| 8,412,837 B1 | 4/2013 | Emigh et al. |
| 8,417,642 B2 | 4/2013 | Oren et al. |
| 8,447,699 B2 | 5/2013 | Batada et al. |
| 8,453,223 B2 | 5/2013 | Svigals et al. |
| 8,453,925 B2 | 6/2013 | Fisher et al. |
| 8,458,487 B1 | 6/2013 | Palgon et al. |
| 8,484,134 B2 | 7/2013 | Hobson et al. |
| 8,485,437 B2 | 7/2013 | Mullen et al. |
| 8,494,959 B2 | 7/2013 | Hathaway et al. |
| 8,498,908 B2 | 7/2013 | Mengerink et al. |
| 8,504,475 B2 | 8/2013 | Brand et al. |
| 8,504,478 B2 | 8/2013 | Saunders et al. |
| 8,510,816 B2 | 8/2013 | Quach et al. |
| 8,528,067 B2 | 9/2013 | Hurry et al. |
| 8,533,860 B1 | 9/2013 | Grecia |
| 8,538,845 B2 | 9/2013 | Liberty |
| 8,555,079 B2 | 10/2013 | Shablygin et al. |
| 8,566,168 B1 | 10/2013 | Bierbaum et al. |
| 8,567,670 B2 | 10/2013 | Stanfield et al. |
| 8,571,939 B2 | 10/2013 | Lindsey et al. |
| 8,577,336 B2 | 11/2013 | Mechaley, Jr. |
| 8,577,803 B2 | 11/2013 | Chatterjee et al. |
| 8,577,813 B2 | 11/2013 | Weiss |
| 8,578,176 B2 | 11/2013 | Mattsson |
| 8,583,494 B2 | 11/2013 | Fisher |
| 8,584,251 B2 | 11/2013 | Mcguire et al. |
| 8,589,237 B2 | 11/2013 | Fisher |
| 8,589,271 B2 | 11/2013 | Evans |
| 8,589,291 B2 | 11/2013 | Carlson et al. |
| 8,595,098 B2 | 11/2013 | Starai et al. |
| 8,595,812 B2 | 11/2013 | Bomar et al. |
| 8,595,850 B2 | 11/2013 | Spies et al. |
| 8,606,638 B2 | 12/2013 | Dragt |
| 8,606,700 B2 | 12/2013 | Carlson et al. |
| 8,606,720 B1 | 12/2013 | Baker et al. |
| 8,615,468 B2 | 12/2013 | Varadarajan |
| 8,620,754 B2 | 12/2013 | Fisher |
| 8,635,157 B2 | 1/2014 | Smith et al. |
| 8,646,059 B1 | 2/2014 | Von Behren et al. |
| 8,651,374 B2 | 2/2014 | Brabson et al. |
| 8,656,180 B2 | 2/2014 | Shablygin et al. |
| 8,751,391 B2 | 6/2014 | Freund |
| 8,762,263 B2 | 6/2014 | Gauthier et al. |
| 8,838,982 B2 | 9/2014 | Carlson et al. |
| 8,856,539 B2 | 10/2014 | Weiss |
| 8,887,308 B2 | 11/2014 | Grecia |
| 9,065,643 B2 | 6/2015 | Hurry et al. |
| 9,070,129 B2 | 6/2015 | Sheets et al. |
| 9,100,826 B2 | 8/2015 | Weiss |
| 9,160,741 B2 | 10/2015 | Wentker et al. |
| 9,229,964 B2 | 1/2016 | Stevelinck |
| 9,245,267 B2 | 1/2016 | Singh |
| 9,249,241 B2 | 2/2016 | Dai et al. |
| 9,256,871 B2 | 2/2016 | Anderson et al. |
| 9,280,765 B2 | 3/2016 | Hammad |
| 9,530,137 B2 | 12/2016 | Weiss |
| 9,680,942 B2 | 6/2017 | Dimmick |
| 2001/0029485 A1 | 10/2001 | Brody et al. |
| 2001/0034720 A1 | 10/2001 | Armes |
| 2001/0054003 A1 | 12/2001 | Chien et al. |
| 2002/0007320 A1 | 1/2002 | Hogan et al. |
| 2002/0016749 A1 | 2/2002 | Borecki et al. |
| 2002/0029193 A1 | 3/2002 | Ranjan et al. |
| 2002/0035548 A1 | 3/2002 | Hogan et al. |
| 2002/0062249 A1 | 5/2002 | Iannacci |
| 2002/0073045 A1 | 6/2002 | Rubin et al. |
| 2002/0116341 A1 | 8/2002 | Hogan et al. |
| 2002/0133467 A1 | 9/2002 | Hobson et al. |
| 2002/0147913 A1 | 10/2002 | Lun Yip |
| 2003/0028481 A1 | 2/2003 | Flitcroft et al. |
| 2003/0101134 A1 | 5/2003 | Liu et al. |
| 2003/0130955 A1 | 7/2003 | Hawthorne |
| 2003/0191709 A1 | 10/2003 | Elston et al. |
| 2003/0191945 A1 | 10/2003 | Keech |
| 2003/0220876 A1 | 11/2003 | Burger et al. |
| 2004/0010462 A1 | 1/2004 | Moon et al. |
| 2004/0050928 A1 | 3/2004 | Bishop et al. |
| 2004/0059682 A1 | 3/2004 | Hasumi et al. |
| 2004/0068472 A1* | 4/2004 | Sahota .............. G06Q 20/10 705/64 |
| 2004/0093281 A1 | 5/2004 | Silverstein et al. |
| 2004/0139008 A1 | 7/2004 | Mascavage, III |
| 2004/0139044 A1 | 7/2004 | Rehwald |
| 2004/0143532 A1 | 7/2004 | Lee |
| 2004/0158532 A1 | 8/2004 | Breck et al. |
| 2004/0210449 A1 | 10/2004 | Breck et al. |
| 2004/0210498 A1 | 10/2004 | Freund |
| 2004/0232225 A1 | 11/2004 | Bishop et al. |
| 2004/0236632 A1 | 11/2004 | Maritzen |
| 2004/0260646 A1 | 12/2004 | Berardi et al. |
| 2005/0033686 A1 | 2/2005 | Peart et al. |
| 2005/0037735 A1 | 2/2005 | Coutts |
| 2005/0038736 A1 | 2/2005 | Saunders |
| 2005/0080730 A1 | 4/2005 | Sorrentino |
| 2005/0108178 A1 | 5/2005 | York |
| 2005/0119978 A1 | 6/2005 | Ates |
| 2005/0127164 A1 | 6/2005 | Wankmueller |
| 2005/0177496 A1 | 8/2005 | Blagg et al. |
| 2005/0199709 A1 | 9/2005 | Linlor |
| 2005/0246293 A1 | 11/2005 | Ong |
| 2005/0269401 A1 | 12/2005 | Spitzer et al. |
| 2005/0269402 A1 | 12/2005 | Spitzer et al. |
| 2006/0105742 A1* | 5/2006 | Kim .............. G06Q 20/04 455/411 |
| 2006/0235795 A1 | 10/2006 | Johnson et al. |
| 2006/0237528 A1 | 10/2006 | Bishop et al. |
| 2006/0278704 A1 | 12/2006 | Saunders et al. |
| 2007/0107044 A1 | 5/2007 | Yuen et al. |
| 2007/0129955 A1 | 6/2007 | Dalmia et al. |
| 2007/0136193 A1 | 6/2007 | Starr |
| 2007/0136211 A1 | 6/2007 | Brown et al. |
| 2007/0170247 A1 | 7/2007 | Friedman |
| 2007/0179885 A1 | 8/2007 | Bird et al. |
| 2007/0208671 A1 | 9/2007 | Brown et al. |
| 2007/0245414 A1 | 10/2007 | Chan et al. |
| 2007/0288377 A1 | 12/2007 | Shaked |
| 2007/0291995 A1 | 12/2007 | Rivera |
| 2008/0015988 A1 | 1/2008 | Brown et al. |
| 2008/0029607 A1 | 2/2008 | Mullen |
| 2008/0035738 A1 | 2/2008 | Mullen |
| 2008/0052226 A1 | 2/2008 | Agarwal et al. |
| 2008/0054068 A1 | 3/2008 | Mullen |
| 2008/0054079 A1 | 3/2008 | Mullen |
| 2008/0054081 A1 | 3/2008 | Mullen |
| 2008/0065554 A1 | 3/2008 | Hogan et al. |
| 2008/0065555 A1 | 3/2008 | Mullen |
| 2008/0201264 A1 | 8/2008 | Brown et al. |
| 2008/0201265 A1 | 8/2008 | Hewton |
| 2008/0228646 A1 | 9/2008 | Myers et al. |
| 2008/0243702 A1 | 10/2008 | Hart et al. |
| 2008/0245855 A1 | 10/2008 | Fein et al. |
| 2008/0245861 A1 | 10/2008 | Fein et al. |
| 2008/0283591 A1 | 11/2008 | Oder, II et al. |
| 2008/0302869 A1 | 12/2008 | Mullen |
| 2008/0302876 A1 | 12/2008 | Mullen |
| 2008/0313264 A1 | 12/2008 | Pestoni |

(56) References Cited

U.S. PATENT DOCUMENTS

| | | |
|---|---|---|
| 2009/0006262 A1 | 1/2009 | Brown et al. |
| 2009/0010488 A1 | 1/2009 | Matsuoka et al. |
| 2009/0037333 A1 | 2/2009 | Flitcroft et al. |
| 2009/0037388 A1 | 2/2009 | Cooper et al. |
| 2009/0043702 A1 | 2/2009 | Bennett |
| 2009/0048971 A1 | 2/2009 | Hathaway et al. |
| 2009/0106112 A1 | 4/2009 | Dalmia et al. |
| 2009/0106160 A1 | 4/2009 | Skowronek |
| 2009/0134217 A1 | 5/2009 | Flitcroft et al. |
| 2009/0157555 A1 | 6/2009 | Biffle et al. |
| 2009/0159673 A1 | 6/2009 | Mullen et al. |
| 2009/0159700 A1 | 6/2009 | Mullen et al. |
| 2009/0159707 A1 | 6/2009 | Mullen et al. |
| 2009/0173782 A1 | 7/2009 | Muscato |
| 2009/0200371 A1 | 8/2009 | Kean et al. |
| 2009/0248583 A1 | 10/2009 | Chhabra |
| 2009/0276347 A1 | 11/2009 | Kargman |
| 2009/0281948 A1 | 11/2009 | Carlson |
| 2009/0294527 A1 | 12/2009 | Brabson et al. |
| 2009/0307139 A1 | 12/2009 | Mardikar et al. |
| 2009/0308921 A1 | 12/2009 | Mullen |
| 2009/0327131 A1 | 12/2009 | Beenau et al. |
| 2010/0008535 A1 | 1/2010 | Abulafia et al. |
| 2010/0088237 A1 | 4/2010 | Wankmueller |
| 2010/0094755 A1 | 4/2010 | Kloster |
| 2010/0106644 A1 | 4/2010 | Annan et al. |
| 2010/0120408 A1 | 5/2010 | Beenau et al. |
| 2010/0133334 A1 | 6/2010 | Vadhri |
| 2010/0138347 A1 | 6/2010 | Chen |
| 2010/0145860 A1 | 6/2010 | Pelegero |
| 2010/0161433 A1 | 6/2010 | White |
| 2010/0185545 A1 | 7/2010 | Royyuru et al. |
| 2010/0211505 A1 | 8/2010 | Saunders et al. |
| 2010/0223186 A1 | 9/2010 | Hogan et al. |
| 2010/0228668 A1 | 9/2010 | Hogan et al. |
| 2010/0235284 A1 | 9/2010 | Moore |
| 2010/0258620 A1 | 10/2010 | Torreyson et al. |
| 2010/0291904 A1 | 11/2010 | Musfeldt et al. |
| 2010/0299267 A1 | 11/2010 | Faith et al. |
| 2010/0306076 A1 | 12/2010 | Taveau et al. |
| 2010/0325041 A1 | 12/2010 | Berardi et al. |
| 2011/0010292 A1 | 1/2011 | Giordano et al. |
| 2011/0016047 A1 | 1/2011 | Wu et al. |
| 2011/0016320 A1 | 1/2011 | Bergsten et al. |
| 2011/0040640 A1 | 2/2011 | Erikson |
| 2011/0047076 A1 | 2/2011 | Carlson et al. |
| 2011/0083018 A1 | 4/2011 | Kesanupalli et al. |
| 2011/0087596 A1 | 4/2011 | Dorsey |
| 2011/0093397 A1 | 4/2011 | Carlson et al. |
| 2011/0125597 A1 | 5/2011 | Oder, II et al. |
| 2011/0153437 A1 | 6/2011 | Archer et al. |
| 2011/0153498 A1 | 6/2011 | Makhotin et al. |
| 2011/0154466 A1 | 6/2011 | Harper et al. |
| 2011/0161233 A1 | 6/2011 | Tieken |
| 2011/0178926 A1 | 7/2011 | Lindelsee et al. |
| 2011/0191244 A1 | 8/2011 | Dai |
| 2011/0238511 A1 | 9/2011 | Park et al. |
| 2011/0238573 A1 | 9/2011 | Varadarajan |
| 2011/0246317 A1 | 10/2011 | Coppinger |
| 2011/0258111 A1 | 10/2011 | Raj et al. |
| 2011/0272471 A1 | 11/2011 | Mullen |
| 2011/0272478 A1 | 11/2011 | Mullen |
| 2011/0276380 A1 | 11/2011 | Mullen et al. |
| 2011/0276381 A1 | 11/2011 | Mullen et al. |
| 2011/0276424 A1 | 11/2011 | Mullen |
| 2011/0276425 A1 | 11/2011 | Mullen |
| 2011/0295745 A1 | 12/2011 | White et al. |
| 2011/0302081 A1 | 12/2011 | Saunders et al. |
| 2012/0028609 A1 | 2/2012 | Hruska |
| 2012/0030047 A1 | 2/2012 | Fuentes et al. |
| 2012/0035998 A1 | 2/2012 | Chien et al. |
| 2012/0041881 A1 | 2/2012 | Basu et al. |
| 2012/0047237 A1 | 2/2012 | Arvidsson et al. |
| 2012/0066078 A1 | 3/2012 | Kingston et al. |
| 2012/0072350 A1 | 3/2012 | Goldthwaite et al. |
| 2012/0078735 A1 | 3/2012 | Bauer et al. |
| 2012/0078798 A1 | 3/2012 | Downing et al. |
| 2012/0078799 A1 | 3/2012 | Jackson et al. |
| 2012/0095852 A1 | 4/2012 | Bauer et al. |
| 2012/0095865 A1 | 4/2012 | Doherty et al. |
| 2012/0116902 A1 | 5/2012 | Cardina et al. |
| 2012/0123882 A1 | 5/2012 | Carlson et al. |
| 2012/0123940 A1 | 5/2012 | Killian et al. |
| 2012/0129514 A1 | 5/2012 | Beenau et al. |
| 2012/0143767 A1 | 6/2012 | Abadir |
| 2012/0143772 A1 | 6/2012 | Abadir |
| 2012/0158580 A1 | 6/2012 | Eram et al. |
| 2012/0158593 A1 | 6/2012 | Garfinkle et al. |
| 2012/0173431 A1 | 7/2012 | Ritchie et al. |
| 2012/0185386 A1 | 7/2012 | Salama et al. |
| 2012/0197807 A1 | 8/2012 | Schlesser et al. |
| 2012/0203664 A1 | 8/2012 | Torossian et al. |
| 2012/0203666 A1 | 8/2012 | Torossian et al. |
| 2012/0215688 A1 | 8/2012 | Musser et al. |
| 2012/0215696 A1 | 8/2012 | Salonen |
| 2012/0221421 A1 | 8/2012 | Hammad |
| 2012/0226582 A1 | 9/2012 | Hammad |
| 2012/0231844 A1 | 9/2012 | Coppinger |
| 2012/0233004 A1 | 9/2012 | Bercaw |
| 2012/0246070 A1 | 9/2012 | Vadhri |
| 2012/0246071 A1 | 9/2012 | Jain et al. |
| 2012/0246079 A1 | 9/2012 | Wilson et al. |
| 2012/0265631 A1 | 10/2012 | Cronic et al. |
| 2012/0271770 A1 | 10/2012 | Harris et al. |
| 2012/0297446 A1 | 11/2012 | Webb et al. |
| 2012/0300932 A1 | 11/2012 | Cambridge et al. |
| 2012/0303503 A1 | 11/2012 | Cambridge et al. |
| 2012/0303961 A1 | 11/2012 | Kean et al. |
| 2012/0304273 A1 | 11/2012 | Bailey et al. |
| 2012/0310725 A1 | 12/2012 | Chien et al. |
| 2012/0310831 A1 | 12/2012 | Harris et al. |
| 2012/0316992 A1 | 12/2012 | Oborne |
| 2012/0317035 A1 | 12/2012 | Royyuru et al. |
| 2012/0317036 A1 | 12/2012 | Bower et al. |
| 2013/0017784 A1 | 1/2013 | Fisher |
| 2013/0018757 A1 | 1/2013 | Anderson et al. |
| 2013/0019098 A1 | 1/2013 | Gupta et al. |
| 2013/0031006 A1 | 1/2013 | Mccullagh et al. |
| 2013/0054337 A1 | 2/2013 | Brendell et al. |
| 2013/0054466 A1 | 2/2013 | Muscato |
| 2013/0054474 A1 | 2/2013 | Yeager |
| 2013/0081122 A1 | 3/2013 | Svigals et al. |
| 2013/0091028 A1 | 4/2013 | Oder, II et al. |
| 2013/0110658 A1 | 5/2013 | Lyman et al. |
| 2013/0111599 A1 | 5/2013 | Gargiulo |
| 2013/0117185 A1 | 5/2013 | Collison et al. |
| 2013/0124290 A1 | 5/2013 | Fisher |
| 2013/0124291 A1 | 5/2013 | Fisher |
| 2013/0124364 A1 | 5/2013 | Mittal |
| 2013/0138525 A1 | 5/2013 | Bercaw |
| 2013/0144888 A1 | 6/2013 | Faith et al. |
| 2013/0145148 A1 | 6/2013 | Shablygin et al. |
| 2013/0145172 A1 | 6/2013 | Shablygin et al. |
| 2013/0159178 A1 | 6/2013 | Colon et al. |
| 2013/0159184 A1 | 6/2013 | Thaw |
| 2013/0166402 A1 | 6/2013 | Parento et al. |
| 2013/0166456 A1 | 6/2013 | Zhang et al. |
| 2013/0173736 A1 | 7/2013 | Krzeminski et al. |
| 2013/0185202 A1 | 7/2013 | Goldthwaite et al. |
| 2013/0191286 A1 | 7/2013 | Cronic et al. |
| 2013/0191289 A1 | 7/2013 | Cronic et al. |
| 2013/0198071 A1 | 8/2013 | Jurss |
| 2013/0198080 A1 | 8/2013 | Anderson et al. |
| 2013/0200146 A1 | 8/2013 | Moghadam |
| 2013/0204787 A1 | 8/2013 | Dubois |
| 2013/0204793 A1 | 8/2013 | Kerridge et al. |
| 2013/0212007 A1 | 8/2013 | Mattsson et al. |
| 2013/0212017 A1 | 8/2013 | Bangia |
| 2013/0212019 A1 | 8/2013 | Mattsson et al. |
| 2013/0212024 A1 | 8/2013 | Mattsson et al. |
| 2013/0212026 A1 | 8/2013 | Powell et al. |
| 2013/0212666 A1 | 8/2013 | Mattsson et al. |
| 2013/0218698 A1 | 8/2013 | Moon et al. |
| 2013/0218769 A1 | 8/2013 | Pourfallah et al. |

(56) References Cited

U.S. PATENT DOCUMENTS

| | | |
|---|---|---|
| 2013/0226799 A1 | 8/2013 | Raj |
| 2013/0226813 A1 | 8/2013 | Voltz |
| 2013/0246199 A1 | 9/2013 | Carlson |
| 2013/0246202 A1 | 9/2013 | Tobin |
| 2013/0246203 A1 | 9/2013 | Laracey |
| 2013/0246258 A1 | 9/2013 | Dessert |
| 2013/0246259 A1 | 9/2013 | Dessert |
| 2013/0246261 A1 | 9/2013 | Purves et al. |
| 2013/0246267 A1 | 9/2013 | Tobin |
| 2013/0254028 A1 | 9/2013 | Salci |
| 2013/0254052 A1 | 9/2013 | Royyuru et al. |
| 2013/0254102 A1 | 9/2013 | Royyuru |
| 2013/0254117 A1 | 9/2013 | Von Mueller et al. |
| 2013/0262296 A1 | 10/2013 | Thomas et al. |
| 2013/0262302 A1 | 10/2013 | Lettow et al. |
| 2013/0262315 A1 | 10/2013 | Hruska |
| 2013/0262316 A1 | 10/2013 | Hruska |
| 2013/0262317 A1 | 10/2013 | Collinge et al. |
| 2013/0275300 A1 | 10/2013 | Killian et al. |
| 2013/0275307 A1 | 10/2013 | Khan |
| 2013/0275308 A1 | 10/2013 | Paraskeva et al. |
| 2013/0282502 A1 | 10/2013 | Jooste |
| 2013/0282575 A1 | 10/2013 | Mullen et al. |
| 2013/0282588 A1 | 10/2013 | Hruska |
| 2013/0297501 A1 | 11/2013 | Monk et al. |
| 2013/0297504 A1 | 11/2013 | Nwokolo et al. |
| 2013/0297508 A1 | 11/2013 | Belamant |
| 2013/0304649 A1 | 11/2013 | Cronic et al. |
| 2013/0308778 A1 | 11/2013 | Fosmark et al. |
| 2013/0311382 A1 | 11/2013 | Fosmark et al. |
| 2013/0317982 A1 | 11/2013 | Mengerink et al. |
| 2013/0332344 A1 | 12/2013 | Weber |
| 2013/0339253 A1 | 12/2013 | Sincai |
| 2013/0346314 A1 | 12/2013 | Mogollon et al. |
| 2014/0007213 A1 | 1/2014 | Sanin et al. |
| 2014/0013106 A1 | 1/2014 | Redpath |
| 2014/0013114 A1 | 1/2014 | Redpath |
| 2014/0013452 A1 | 1/2014 | Aissi et al. |
| 2014/0019352 A1 | 1/2014 | Shrivastava |
| 2014/0025581 A1 | 1/2014 | Calman |
| 2014/0025585 A1 | 1/2014 | Calman |
| 2014/0025958 A1 | 1/2014 | Calman |
| 2014/0032417 A1 | 1/2014 | Mattsson |
| 2014/0032418 A1 | 1/2014 | Weber |
| 2014/0040137 A1 | 2/2014 | Carlson et al. |
| 2014/0040139 A1 | 2/2014 | Brudnicki et al. |
| 2014/0040144 A1 | 2/2014 | Plomske et al. |
| 2014/0040145 A1 | 2/2014 | Ozvat et al. |
| 2014/0040148 A1 | 2/2014 | Ozvat et al. |
| 2014/0040628 A1 | 2/2014 | Fort et al. |
| 2014/0041018 A1 | 2/2014 | Bomar et al. |
| 2014/0046853 A1 | 2/2014 | Spies et al. |
| 2014/0047551 A1 | 2/2014 | Nagasundaram et al. |
| 2014/0052532 A1 | 2/2014 | Tsai et al. |
| 2014/0052620 A1 | 2/2014 | Rogers et al. |
| 2014/0052637 A1 | 2/2014 | Jooste et al. |
| 2014/0068706 A1 | 3/2014 | Aissi |
| 2014/0074637 A1 | 3/2014 | Hammad |
| 2014/0108172 A1 | 4/2014 | Weber et al. |
| 2014/0114857 A1 | 4/2014 | Griggs et al. |
| 2014/0143137 A1 | 5/2014 | Carlson |
| 2014/0164243 A1 | 6/2014 | Aabye et al. |
| 2014/0188586 A1 | 7/2014 | Carpenter et al. |
| 2014/0249945 A1 | 9/2014 | Gauthier |
| 2014/0294701 A1 | 10/2014 | Dai et al. |
| 2014/0310183 A1 | 10/2014 | Weber |
| 2014/0330721 A1 | 11/2014 | Wang |
| 2014/0330722 A1 | 11/2014 | Laxminarayanan et al. |
| 2014/0331265 A1 | 11/2014 | Mozell et al. |
| 2014/0337236 A1 | 11/2014 | Wong et al. |
| 2014/0344153 A1 | 11/2014 | Raj et al. |
| 2014/0372308 A1 | 12/2014 | Sheets |
| 2015/0019443 A1 | 1/2015 | Sheets et al. |
| 2015/0032625 A1 | 1/2015 | Dill et al. |
| 2015/0032626 A1 | 1/2015 | Dill et al. |
| 2015/0032627 A1 | 1/2015 | Dill et al. |
| 2015/0046338 A1 | 2/2015 | Laxminarayanan et al. |
| 2015/0046339 A1 | 2/2015 | Wong et al. |
| 2015/0052064 A1 | 2/2015 | Karpenko et al. |
| 2015/0088756 A1 | 3/2015 | Makhotin et al. |
| 2015/0106239 A1 | 4/2015 | Gaddam et al. |
| 2015/0112870 A1 | 4/2015 | Nagasundaram et al. |
| 2015/0112871 A1 | 4/2015 | Kumnick |
| 2015/0120472 A1 | 4/2015 | Aabye et al. |
| 2015/0127529 A1 | 5/2015 | Makhotin et al. |
| 2015/0127547 A1 | 5/2015 | Powell et al. |
| 2015/0140960 A1 | 5/2015 | Powell et al. |
| 2015/0142673 A1 | 5/2015 | Nelsen et al. |
| 2015/0161597 A1 | 6/2015 | Subramanian et al. |
| 2015/0178724 A1 | 6/2015 | Ngo et al. |
| 2015/0180836 A1 | 6/2015 | Wong et al. |
| 2015/0186864 A1 | 7/2015 | Jones et al. |
| 2015/0193222 A1 | 7/2015 | Pirzadeh et al. |
| 2015/0195133 A1 | 7/2015 | Sheets et al. |
| 2015/0199679 A1 | 7/2015 | Palanisamy et al. |
| 2015/0199689 A1 | 7/2015 | Kumnick et al. |
| 2015/0220917 A1 | 8/2015 | Aabye et al. |
| 2015/0269566 A1 | 9/2015 | Gaddam et al. |
| 2015/0278799 A1 | 10/2015 | Palanisamy |
| 2015/0287037 A1 | 10/2015 | Salmon |
| 2015/0312038 A1 | 10/2015 | Palanisamy |
| 2015/0319158 A1 | 11/2015 | Kumnick |
| 2015/0332262 A1 | 11/2015 | Lingappa |
| 2015/0356560 A1 | 12/2015 | Shastry et al. |
| 2015/0363781 A1 | 12/2015 | Badenhorst |
| 2016/0028550 A1 | 1/2016 | Gaddam et al. |
| 2016/0036790 A1 | 2/2016 | Shastry et al. |
| 2016/0042263 A1 | 2/2016 | Gaddam et al. |
| 2016/0065370 A1 | 3/2016 | Le Saint et al. |
| 2016/0092696 A1 | 3/2016 | Guglani et al. |
| 2016/0092872 A1 | 3/2016 | Prakash et al. |
| 2016/0092874 A1 | 3/2016 | O'Regan |
| 2016/0103675 A1 | 4/2016 | Aabye et al. |
| 2016/0119296 A1 | 4/2016 | Laxminarayanan et al. |
| 2016/0132878 A1 | 5/2016 | O'Regan |
| 2016/0197725 A1 | 7/2016 | Hammad |
| 2016/0269391 A1 | 9/2016 | Gaddam et al. |
| 2016/0308995 A1 | 10/2016 | Youdale et al. |
| 2017/0109745 A1 | 4/2017 | Al-Bedaiwi |
| 2017/0186001 A1 | 6/2017 | Reed et al. |
| 2017/0201520 A1 | 7/2017 | Chandoor |
| 2017/0295155 A1 | 10/2017 | Wong et al. |
| 2017/0364903 A1 | 12/2017 | Lopez |
| 2018/0075081 A1 | 3/2018 | Chipman |

FOREIGN PATENT DOCUMENTS

| | | |
|---|---|---|
| EP | 2156397 A1 | 2/2010 |
| JP | 2005-520269 A | 7/2005 |
| RU | 2259587 C2 | 8/2005 |
| RU | 2004109577 A | 8/2005 |
| WO | 2000/014648 A1 | 3/2000 |
| WO | 2001035304 A1 | 5/2001 |
| WO | 01/73580 A1 | 10/2001 |
| WO | 03/019445 A1 | 3/2003 |
| WO | 03/081832 A2 | 10/2003 |
| WO | 2004/051585 A2 | 11/2003 |
| WO | 2004/006064 A2 | 1/2004 |
| WO | 2004042536 A2 | 5/2004 |
| WO | 2005/001751 A1 | 6/2004 |
| WO | 2006113834 A2 | 10/2006 |
| WO | 2001035304 A9 | 3/2009 |
| WO | 2009032523 A1 | 3/2009 |
| WO | 2010078522 A1 | 7/2010 |
| WO | 2012068078 A2 | 5/2012 |
| WO | 2012098556 A1 | 7/2012 |
| WO | 2012142370 A2 | 10/2012 |
| WO | 2012167941 A1 | 12/2012 |
| WO | 2013048538 A1 | 4/2013 |
| WO | 2013056104 A1 | 4/2013 |

(56) References Cited

FOREIGN PATENT DOCUMENTS

| | | |
|---|---|---|
| WO | 2013119914 A1 | 8/2013 |
| WO | 2013179271 A2 | 12/2013 |

OTHER PUBLICATIONS

Wang, U.S. Appl. No. 62/000,288 (unpublished), Payment System Canonical Address Format filed May 19, 2014.
Sharma et al., U.S. Appl. No. 62/003,717 (unpublished), Mobile Merchant Application filed May 28, 2014.
Kalgi et al., U.S. Appl. No. 62/024,426, (unpublished) Secure Transactions Using Mobile Devices filed Jul. 14, 2014.
Prakash et al., U.S. Appl. No. 62/037,033 (unpublished), Sharing Payment Token filed Aug. 13, 2014.
Hoverson et al., U.S. Appl. No. 62/038,174 (unpublished), Customized Payment Gateway filed Aug. 15, 2014.
Wang, U.S. Appl. No. 62/042,050 (unpublished), Payment Device Authentication and Authorization System filed Aug. 26, 2014.
Gaddam et al., U.S. Appl. No. 62/053,736 (unpublished), Completing Transactions Without a User Payment Device filed Sep. 22, 2014.
Patterson, U.S. Appl. No. 62/054,346 (unpublished), Mirrored Token Vault filed Sep. 23, 2014.
Dimmick, U.S. Appl. No. 14/952,514 (unpublished), Systems Communications With Non-Sensitive Identifiers filed Nov. 25, 2015.
Dimmick, U.S. Appl. No. 14/952,444 (unpublished), Tokenization Request Via Access Device filed Nov. 25, 2015.
Prakash et al., U.S. Appl. No. 14/955,716 (unpublished), Provisioning Platform for Machine-To-Machine Devices filed Dec. 1, 2015.
Wong et al., U.S. Appl. No. 14/966,948 (unpublished), Automated Access Data Provisioning filed Dec. 11, 2015.
Stubbs et al., U.S. Appl. No. 62/103,522 (unpublished), Methods and Systems for Wallet Provider Provisioning filed Jan. 14, 2015.
Mcguire, U.S. Appl. No. 14/600,523 (unpublished), Secure Payment Processing Using Authorization Request filed Jan. 20, 2015.
Flurscheim et al., U.S. Appl. No. 15/004,705 (unpublished), Cloud-Based Transactions With Magnetic Secure Transmission filed Jan. 22, 2016.
Flurscheim et al., U.S. Appl. No. 62/108,403 (unpublished), Wearables With NFC HCE filed Jan. 27, 2015.
Sabba et al., U.S. Appl. No. 15/011,366 (unpublished), Token Check Offline filed Jan. 29, 2016.
Patterson, U.S. Appl. No. 15/019,157 (unpublished), Token Processing Utilizing Multiple Authorizations filed Feb. 9, 2016.
Cash et al., U.S. Appl. No. 15/041,495 (unpublished), Peer Forward Authorization of Digital Requests filed Feb. 11, 2016.
Le Saint et al., U.S. Appl. No. 15/008,388 (unpublished), Methods for Secure Credential Provisioning filed Jan. 27, 2016.
Kinagi, U.S. Appl. No. 62/117,291 (unpublished), Token and Cryptogram Using Transaction Specific Information filed Feb. 17, 2015.
Galland et al. U.S. Appl. No. 62/128,709 (unpublished), Tokenizing Transaction Amounts filed Mar. 5, 2015.
Rangarajan et al., U.S. Appl. No. 61/751,763 (unpublished), Payments Bridge filed Jan. 11, 2013.
Li, U.S. Appl. No. 61/894,749 (unpublished), Methods and Systems for Authentication and Issuance of Tokens in a Secure Environment filed Oct. 23, 2013.
Aissi et al., U.S. Appl. No. 61/738,832 (unpublished), Management of Sensitive Data filed Dec. 18, 2012.
Wong et al., U.S. Appl. No. 61/879,362 (unpublished), Systems and Methods for Managing Mobile Cardholder Verification Methods filed Sep. 18, 2013.
Powell, U.S. Appl. No. 61/892,407 (unpublished), Issuer Over-The-Air Update Method and System filed Oct. 17, 2013.
Powell, U.S. Appl. No. 61/926,236 (unpublished), Methods and Systems for Provisioning Mobile Devices With Payment Credentials and Payment Token Identifiers filed Jan. 10, 2014.
Search/Examination Report dated Aug. 31, 2010 from Russian Federation Patent Application No. 2008113214, 10 pages.
Search/Examination Report dated Sep. 13, 2010 from Chinese Patent Application No. 200680041246.7, 18 pages.
Japanese Office Action dated Feb. 13, 2012, for Japanese Patent Application No. 2008-530147, with an English Translation, 10 pages.
Canadian Office Action dated Jan. 10, 2013 for Canadian Patent Application No. 2,621,358, 2 page.
Chinese Office Action dated Jan. 30, 2012 for Chinese Patent Application No. 200680041246.7, with English Translation, 7 pages.
Chinese Office Action dated Sep. 13, 2013 for Chinese Patent Application No. 200680041246.7, with English Translation, 14 pages.
Notice of Allowance dated Jan. 8, 2013 for Japanese Patent Application No. 2008-530147, 4 pages.
Japanese Decision of Final Rejection dated Jun. 12, 2012 for Japanese Patent Application No. 2008-530147, with English Translation, 7 pages.
Korean Notice of Non-Final Rejection dated Mar. 29, 2013 for Korean Patent Application 10-2008-7008119, with English Translation, 7 pages.
Korean Notice of Last Non-Final Rejection dated Sep. 10, 2013 for Korean Patent Application No. 10-2008-7008119, with English Translation, 5 pages.
Edward et al., "Universal Electronic Payment Apparatuses, Methods and Systems"; Sep. 27, 2011; WIPO/Thomson; 6/3K/3 (Item 1 from file: 349).
Lyle, "Merchant-Consumer Bridging Platform Apparatuses, Methods and System", Feb. 5, 2011; WIPO/Thomson; 6/3K/4 (Item 2 from file: 349).
Judson, "Encryption Switch Processing," Nov. 5, 2009; WIPO/Thompson; 6/3K/5 (Item 3 from fle: 349).
Canadian Office Action dated Mar. 19, 2014 for Canadian Patent Application No. 2,621,358, 3 page.
Japanese Notice of Rejection dated Nov. 12, 2013 for Japanese Patent Application No. 2012-227388, with translation, 5 pages.
Japanese Notice of Reasons for Rejection dated Jul. 23, 2013 for Japanese Patent Application No. 2012-227388, with translation, 7 pages.
Decision of Grant dated Mar. 4, 2014 for Japanese Patent Application No. 2012-227388, with letter from foreign associate, 4 pages.
Korean Notice of Allowance dated Dec. 30, 2013 for Korean Patent Application No. 10-2008-7008119, with English Translation, 3 pages.
Notice of Acceptance dated May 26, 2011 for Australian Patent Application No. 2006287606, 3 pages.
Notice of Allowance dated Feb. 14, 2014 for U.S. Appl. No. 11/398,887, 12 pages.
Non-Final Office Action dated May 8, 2013 for U.S. Appl. No. 11/398,887, 13 pages.
Final Office Action dated Dec. 22, 2011 for U.S. Appl. No. 11/398,887, 23 pages.
Office Action dated Apr. 28, 2011 for U.S. Appl. No. 11/398,887, 19 pages.
Office Action dated Jan. 24, 2011 for U.S. Appl. No. 11/398,887, 7 pages.
Office Action dated Jun. 22, 2010 for U.S. Appl. No. 11/398,887, 16 pages.
Office Action dated Jan. 28, 2010 for U.S. Appl. No. 11/398,887, 13 pages.
Office Action dated Jun. 16, 2009 for U.S. Appl. No. 11/398,887, 20 pages.
Office Action dated Nov. 13, 2008 for U.S. Appl. No. 11/398,887, 22 pages.
Partial Translation of Office Action dated Nov. 2, 2010 for Mexican Application No. MX/a/2008/003108, 3 pages.
Final Office Action dated Aug. 7, 2015 for U.S. Appl. No. 14/275,715, 24 pages.
Canadian Office Action dated Aug. 13, 2015 for Patent Application No. 2,621,358, 3 pages.
Non-Final Office Action dated Jan. 14, 2015 for U.S. Appl. No. 14/275,715, 22 pages.
International Search Report dated Apr. 30, 2007 for PCT Application No. PCT/US06/34612, 3 pages.

(56) References Cited

OTHER PUBLICATIONS

English translation of Decision on Grant dated Dec. 1, 2010 for Russian Application No. 2008113214, 5 pages.
Office Action dated Aug. 26, 2014 for Indian Patent Application No. 1693/CHENP/2008, 3 pages.
Kaja, et al., U.S. Appl. No. 15/585,077 (Unpublished), System and Method Using Interaction Token, filed May 2, 2017.
Hammad, U.S. Appl. No. 15/977,921 (Unpublished), Integration of Verification Tokens with Mobile Communication Devices, filed May 11, 2018.
Raj, et al. U.S. Appl. No. 15/956,991 (Unpublished), Mobile Tokenization Hub, filed Apr. 19, 2018.
Non-Final Office Action, dated Feb. 21, 2019, in U.S. Appl. No. 14/275,715, 6 pages.

\* cited by examiner

SYSTEM AND METHOD FOR SECURED ACCOUNT NUMBERS IN PROXIMITY DEVICES

CROSS-REFERENCES TO RELATED APPLICATIONS

This application is a divisional of U.S. patent application Ser. No. 11/398,887 filed Apr. 5, 2006, entitled "System and Method for Secured Account Numbers in Proximity Devices," which claims priority to U.S. Provisional Patent Application No. 60/714,635 filed Sep. 6, 2005, entitled "System And Method Using Ghost Account Number," the entireties of which are hereby incorporated by reference for all purposes.

BACKGROUND OF THE INVENTION

The present invention relates in general to portable proximity consumer devices used in wireless payment transactions, and in particular to various embodiments of portable proximity consumer devices, such as credit and debit contactless smart cards, that use secured account numbers for wireless financial transactions.

Generally, portable proximity consumer devices such as contactless smart cards are designed to provide the consumer with a way to engage in purchase transactions by wirelessly connecting the portable proximity consumer devices directly with the merchant's point of sales device, for instance using radio frequency (RF) or infrared (IR) signals. For example, contactless smart cards allow a consumer to store and transmit financial data and other personal data to a merchant device which uses it to effect a payment during a purchase transaction.

Because portable proximity consumer devices operate without requiring direct connection to the accepting device, portable proximity consumer devices are expected to gain popularity over other types of devices that require physical contact and/or physical connections to communicate with other devices and systems. Illustratively, contactless smart cards may be used to replace regular credit cards, as they need not be in contact with a transaction terminal to be operated. Regular credit cards having magnetic stripes and contact smart cards must come in contact with a reader.

Portable proximity consumer devices may wirelessly exchange data with a proximity device reader from a distance, as long as the user is in wireless range of the proximity device reader. Unfortunately, due to the wireless nature of the portable proximity consumer devices, it is possible that proximity device reader may be used for surreptitious interrogation of the portable proximity consumer device by intercepting the portable proximity electronic device's communications. In addition, it is conceivable that a proximity accepting device may be developed or modified to enhance its power and sensitivity and thereby increase its ability to interrogate with and intercept signals from the portable proximity consumer devices from a greater distance than specified in standards used for portable proximity consumer devices.

Theft of sensitive information using wireless interrogation or interception of communications from portable proximity consumer devices is a major concern for consumers and businesses alike. Unfortunately, given the sophistication of the wireless interrogation equipment and the nature of wireless signals, it is easy for wireless interrogation to occur at virtually any time and place. Once the victim of the wireless interrogation discovers that they had sensitive information stolen, it is often too late to discover where the theft took place. The victim must then deal with the consequences and hassle of correcting the unauthorized access and possible uses of the information.

In response to such risk, many payment service providers have instigated safeguards for protecting purchases from fraudulent attacks, for example, by employing encryption technologies to encrypt the primary account number and other data associated with account transactions. Encryption generally involves encrypting transaction data on one end of a transmission with a key, and then regenerating the original transaction data by decrypting the encrypted data received with the same key on the other end of the transmission. While encryption technologies have proven to be highly effective in preventing information theft, implementing or upgrading to the latest encryption technology often requires upgrades by the end user's of payment processing systems. Due to the cost, time, and risk of potential business interruption (e.g., loss of sales), many merchants, for example, resist making necessary upgrades to their procedures and systems to implement such safeguards. Therefore, such safeguards have had limited success as they are generally expensive to implement, can be overcome, and have not been fully accepted by the credit card industry, merchants, payment processors, etc.

Therefore, what is needed is a cost effective device and method that integrates easily with exiting payment processing systems and prevents an unauthorized user from using data wirelessly interrogated or intercepted from a portable proximity consumer devices.

BRIEF SUMMARY OF THE INVENTION

Embodiments of the present invention provide an apparatus and method for conducting financial transactions using secured account numbers from portable proximity consumer devices.

Embodiments of the invention include the use of "secured account numbers". These may include "ghost" account numbers. A ghost account number can be one that is related to a person's real account number.

In one embodiment, the present invention provides a method including receiving an authorization request message which includes a secured account number. The secured account number is associated with a real account number. In this embodiment, the authorization request message originates from a transaction that results from a wireless based interaction between a portable proximity consumer devices including a wireless communication module and a memory pre-loaded with the secured account number and a proximity reader device including a second wireless communication module. The secured account number is wirelessly transmitted from the portable proximity consumer device to the proximity reader device. The secured account number may then be transmitted to a server computer operated by an acquirer, payment processing system, and/or issuer. After the secured account number is received by the server computer, the real account number is determined. Once the real account number is determined, the issuer, for example, may proceed with its usual transaction authorization methods and processes. The issuer may then send an authorization response message back to the proximity reader device to inform the consumer that the transaction is or is not authorized.

In another embodiment, the present invention provides a portable proximity consumer device for performing contactless transactions. The portable proximity consumer device includes a first antenna, a first memory including a secured account number coupled to the first antenna, and a second memory wherein the second memory comprising a real account number, wherein the real account number is associated with the secured account number.

In another embodiment, the present invention provides a system for performing payment transactions. The system includes a payment processing system capable of converting a secured account number to a user's real account number. In response to the payment processing system receiving a transaction authorization request comprising the secured account number, the payment processing system determines the user's real account number associated with the secured account number, and verifies that the transaction authorization request was associated with a wireless payment transaction.

These and other embodiments of the invention are described in further detail below.

DETAILED DESCRIPTION

Figure 1:
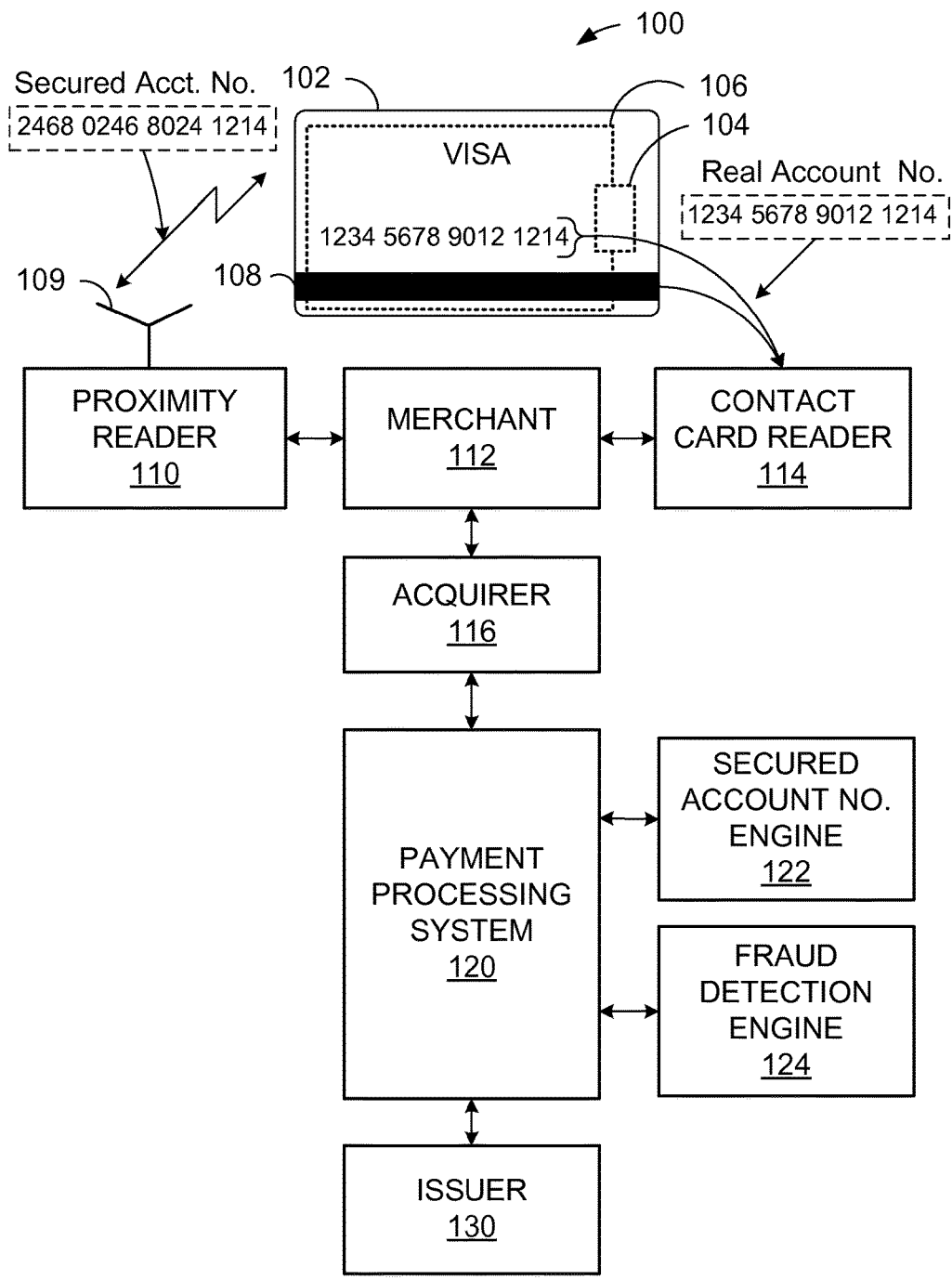
FIG. 1 is a high-level block diagram illustrating one embodiment of a transaction processing system in accordance with embodiments of the invention.

Embodiments of the invention are directed to the use of a secured account number preloaded onto a portable proximity consumer device. Portable proximity consumer devices may be any portable consumer device such as a contactless smart debit/credit card, contact chip enabled debit/credit card, a PDA, mobile phone, and the like, capable of wireless transmission of a secured account number, in lieu of a user's primary account number (PAN) or a user's real account number. As described herein, the term "proximate" may be used interchangeably with terms such as contactless relating to transactions wirelessly communicated between devices proximate to one another.

Secured account numbers may include "ghost" account numbers. In one embodiment, a ghost account number can be one that is related to a person's real account number. The secured account number may be considered an account number capable of resembling a user's real account number (e.g., a real PAN). For example, if a user's real account number contains nineteen digits, the secured account number may also contain nineteen digits. It is contemplated that the secured account number may be of any length as long as it resembles a real account number, such as a credit card number, debit card number, gift card number, and the like. For example, the secured account number may resemble a gift card number that is twenty one digits in length, when the user's real account number is nineteen digits long. The secured account number may also be a static number. The term "static" means that the secured account number does not have to change between transactions, but may change when the user changes accounts, the user's real account number expires, the portable proximity consumer device is lost or stolen, etc. The secured account number may also be described using terms such as bogus, fake, decoy, substitute, and the like, which signify an alphanumeric sequence that is used in place of a user's real account number to perform transactions.

In embodiments of the invention, the secured account number may be preloaded into a first memory in a portable proximity consumer device, while the user's real account number is stored in a second memory in the portable proximity consumer device. The first and second memories may use different data storage technologies. For example, the first memory may include a memory chip, and the second memory may be in the form of a magnetic stripe.

The portable proximity consumer device can operate in a variety of wireless transmission modes such as a contactless mode or an infrared mode, RF mode (i.e., Radio Frequency), and the like, and optionally may be operated in a contact mode such as through a hardwired communication interface. The secured account number is used in wireless transactions. The user's regular account number is used and transmitted when the portable proximity consumer device is used in a contact mode, or when the consumer performs a direct entry transaction (e.g., entering a real account number onto a Web form to purchase goods on the Internet).

Put another way, the secured account number is not used for contact transactions or direct entry transactions. For example, in a non-wireless transaction, when the secured account number is entered onto a Web form via an Internet merchant portal, the transaction will not be unauthorized. This is useful if someone (e.g., a thief) surreptitiously intercepts the secured account number during a contactless purchase transaction and obtains the secured account number. Because the secured account number is configured to resemble a real account number, it will deceive the unauthorized user into believing that it is an operable account number. However, if the unauthorized user enters the secured account number onto a Web form to conduct a transaction, the transaction is not authorized by the issuer, unless, for example, the issuer is using the transaction as a means to catch the unauthorized user. Furthermore, the secured account number is configured such that unauthorized users may not retrieve the real account number for use in fraudulent transactions, without access to a database configured to keep the real account number secret from unauthorized access. As will be explained in further detail below, this is advantageous as it can make it easier to detect an unauthorized transaction and discover potential fraud. In addition, the secured account number does not provide sufficient information to route the transaction to the appropriate issuer since the secured account does not provide a valid transaction path number (e.g., bank identification number). Thus, the present invention creates multiple challenges to prevent the transaction that the thief tries to conduct from being authorized.

The portable proximity consumer devices according to embodiments of the invention can be used with authorized wireless interrogation devices (e.g., authorized proximity reader devices) that can also have wireless communication and transmission modules (e.g., receiver, transceiver, etc.). Such authorized interrogation devices may be present at point-of-sale (POS) terminals, ATM (automatic teller machines), and the like. Such interrogation devices are well known in the art. The portable proximity consumer devices according to embodiments of the invention may operate with any number of such authorized wireless interrogation devices using a variety of operating standards. For example, such a standard may be the Europay-Mastercard-Visa (EMV) standard started by a working group created in 1993 by the world's three main payment organizations: EURO-PAY (EPI), MASTERCARD (MCI) and VISA.

As noted above and below, an exemplary portable proximity consumer device may include a memory such as a memory chip and/or a microprocessor. Either may be operationally coupled to the communication and/or transmission modules in the portable proximity consumer device. The memory could be in the form of a memory chip or could be wired logic. The information in the memory may include information such as a user's bank account information, secured account number, credit or debit account number information, account balance information, consumer information, etc.

In some embodiments, during a process for authorizing an electronic payment transaction, the secured account number is wirelessly transmitted from a portable proximity consumer device to the proximity reader device performing the transaction, such as, for instance, a contactless smart card transaction terminal. The secured account number is then transmitted from the contactless smart card transaction terminal at a merchant, to the merchant's acquirer, to a payment processing system, and then to the issuer. In one embodiment, one or more computational apparatuses at any one of these entities may be used to convert the secured account number into the user's real account number so that the issuer can respond to a submitted authorization request message.

In embodiments of the invention, an authorization request message for a transaction is created after a consumer purchases a good or service at a POS terminal using a portable proximity consumer device such as a credit or debit card. The authorization request message may be sent from the POS terminal located at a merchant to the merchant's acquirer, to a payment processing system, and then to an issuer.

A "merchant" in embodiments of the invention can have any suitable characteristics. A merchant may include entities such as corporations, sole proprietorships, non-profit organizations, or a specific group of such entities. Examples of merchants include restaurants, theaters, gasoline and fuel stores, grocery stores, clothing retailers, department stores, etc. The merchant has one or more POS terminals that can interact with the portable proximity consumer devices. Any suitable POS terminal may be used including card readers as described herein. The card readers may include any suitable contact or proximity mode of operation. For example, exemplary card readers can include RF (radio frequency) antennas, magnetic stripe readers, etc. to interact with the portable proximity consumer devices.

An "acquirer" is typically a business entity, e.g., a commercial bank that has a business relationship with a particular merchant. An "issuer" is typically a business entity (e.g., a bank) that issues a portable proximity consumer device such as a credit or debit card to a consumer. Some entities such as American Express perform both issuer and acquirer functions. Embodiments of the invention encompass such single entity issuer-acquirers.

An "authorization request message" can include a request for authorization to conduct an electronic payment transaction or some other type of activity. It may include one or more of an account holder's payment account number, currency code, sale amount, merchant transaction stamp, acceptor city, acceptor state/country, POS transaction number, POS transaction type, etc. Optionally, an authorization request message may be protected using a secure encryption method—e.g., 128-bit SSL or equivalent—in order to prevent data from being compromised. In other embodiments, an "authorization request message" may include a request for permission to enter a predetermined location (e.g., as used for wireless access badges).

Typically, an electronic payment transaction is authorized if the consumer conducting the transaction has sufficient funds or credit to conduct the transaction. Conversely, if there are insufficient funds or credit in the consumer's account, or if the consumer's portable proximity consumer device is on a blacklist (e.g., it is indicated as stolen), then an electronic payment transaction may not be authorized (e.g., declined).

FIG. 1 is a high-level block diagram illustrating one embodiment of a transaction processing system 100. The transaction processing system 100 includes a merchant 112, an acquirer 116, a payment processing system 120, and an account number issuer 130.

The transaction processing system 100 also includes a proximity reader device 110 capable of wirelessly receiving secured account numbers, and an optional contact reader 114, capable of receiving real account numbers from a portable proximity consumer device 102 such as a credit or debit smart card. The proximity reader device 110 and/or the contact reader 114 can be located at the merchant 112, or may be simply operated by the merchant 112.

The portable proximity consumer device 102 according to embodiments of the invention may be in any suitable form. For example, the portable proximity consumer device 102 can be hand-held and compact so that it can fit into a consumer's wallet and/or pocket (e.g., pocket-sized). For example, the portable proximity consumer device 102 may include smart cards, ordinary credit or debit cards (with a magnetic stripe and without a microprocessor), a keychain device, key Fob, etc. Other examples of contactless portable proximity consumer devices 102 include cellular phones, personal digital assistants (PDAs), pagers, payment cards, security cards, access cards, smart media, transponders, and the like. Such portable proximity consumer devices 102 can have one or more antennas 106 coupled to wireless transmission devices that can transmit and/or receive signals and data through a wireless communication medium.

The payment processing system 120 may include data processing subsystems, networks, and operations used to support and deliver authorization services, exception file services, and clearing and settlement services. An exemplary payment processing system 120 may include VisaNet™. Payment processing systems such as VisaNet™ are able to process credit card transactions, debit card transactions, and other types of commercial transactions. VisaNet™, in particular, includes a single message system (SMS) that automatically authorizes and provides enough information to automatically clear and settle a financial transaction, and/or a VIP system (Visa Integrated Payments system) which processes authorization requests and a Base II system, which performs clearing and settlement services.

The payment processing system 120 may include a server computer. A server computer is typically a powerful computer or cluster of computers. For example, the server computer can be a large mainframe, a minicomputer cluster, or a group of servers functioning as a unit. In one example, the server computer may be a database server coupled to a web server. The payment processing system 120 may use any suitable wired or wireless network, including the Internet.

In one embodiment, the proximity reader device 110 is capable of wirelessly receiving a secured account number from a portable proximity consumer device 102. For example, as illustrated in FIG. 1, the secured account number "2468 0246 8024 1214" may be wirelessly transmitted from an antenna 106 of the portable proximity consumer device 102 to an antenna 109 coupled to a wireless transceiver of the proximity reader device 110 during a financial transaction by a consumer (e.g. user of a portable proximity consumer device). As described above, the contact reader 114 is capable of receiving a user's real account number from the portable proximity consumer device 102. For example, for a credit/debit smart card, the contact reader 114 is capable of retrieving information from a magnetic stripe, or by hand (e.g., by an operator of the contact reader 114). Illustratively, the contact reader 114 is capable of reading the user's real account number "1234 5678 9012 1214" from the magnetic stripe 108, and/or an operator may enter the user's real account number "1234 5678 9012 1214" into the contact reader 114 by hand.

The secured account number may be derived from the user's real account number using any suitable algorithm. For example, one exemplary algorithm multiplies the first twelve numbers of the user's real card number by two and then takes the last digit of the new number, e.g., 1234 5678 9012 1214, to convert the user's real account number to a secured account number, e.g. 2468 0246 8024 1214. In this example, the algorithm may leave a single digit in each digit location. As illustrated above, when the number five is multiplied by two, the algorithm drops the resultant one of the "10" to leave the zero. Of course, other algorithms may be used. Any such algorithms preferably leave the last four digits of the real account number unaltered. Typical credit card receipts mask the first series of numbers of a user's account number, but exposes the last four digits. By not altering the last four digits, the consumer does not know whether a secured account number or the real account number is used in a particular transaction. This is advantageous, as it avoids confusion on the part of the consumer and may deter fraudulent activities related to the retrieval of receipts.

The resultant secured account number may be stored in a database along with the real account number in a lookup table with other corresponding secured and real account numbers. The database may be accessible to the acquirer 116, payment processing system 120, and/or the issuer 130. The database is preferably accessible to at least one of the payment processing system 120 and/or the issuer 130, since the issuer 130 authorizes or does not authorize the user's transaction.

The secured account numbers may be preloaded into the user's portable proximity consumer device 102. The one or more algorithms may be used at any time, e.g., prior to manufacturing, during the manufacturing, or during processing of the consumer portable proximity device 102, to generate the secured account numbers. For example, the algorithm may be used when generating real account numbers, during production of the portable proximity consumer device 102, during account number activation, or when preparing to preload the secured account numbers into the portable proximity consumer devices 102, etc.

It is desirable to "preload" the secured account number into a memory in the portable proximity consumer device 102. As noted above, encryption techniques are known. However, such encryption techniques require the use of lengthy computer programs that need to be stored on the portable proximity consumer device. Such lengthy computer programs occupy valuable space in the memory of the portable proximity consumer device 102. By using a preloaded secured account number that resembles a real account number, a relatively small amount of space is used in the memory of the portable proximity consumer device 102. Additionally, the software and the hardware associated with the proximity reader device 110 and/or the contact card reader 114 need not be altered since the secured account number has the same form as the real account number.

In one operational embodiment, during a consumer purchase transaction, an authorization request message including a secured account number is wirelessly transmitted from the portable proximity consumer device 102 to the proximity reader device 110. For example, a consumer can purchase an article of clothing with a contactless smart card. The authorization request message including the secured account number and a POS transaction type identifier (indicative that the transaction was a wireless type of proximity transaction) is received by the merchant 112 and is transmitted to the acquirer 116. The acquirer 116 then transmits, among other information, the authorization request message including the secured account number, POS transaction type identifier to the payment processing system 120 for processing thereof.

In one embodiment, the POS transaction type identifier may be an alphanumeric indicator, symbol, and the like. It may indicate that transaction that was conducted was a proximity financial transaction, and was not a contact-type transaction. For example, the POS transaction type identifier may be a conventional number used in the credit card industry such as "POS entry code 91", or could be a modified version of a standard indicator such as a modified international standards organization (ISO) indicator. After a server computer at the payment processing system 120 receives the authorization request message, the payment processing system 120 identifies the transmitted account number as a secured account number and uses the POS transaction type identifier to identify the transaction as a wireless transaction. If the secured account number is valid and if the transaction is identified as a wireless transaction, then the payment processing system 120 converts the secured account number to the user's real account number. The real account number is then transmitted to the issuer 130 for payment authorization.

The real account number includes the real account number's BIN (bank identification number) so the transaction processing system 120 knows which particular issuer is supposed to receive the authorization request message. Generally, a BIN corresponds to the first six digits of the user's real account number (e.g., a credit or debit account number). These first six digits identify which network the portable proximity consumer device 102 is associated with as well as which issuer 130 issued the portable proximity consumer device 102. If the transaction is authorized by the issuer 130, the payment processing system 120 transmits an authorization response message along with the secured account number (or real account number) back to the acquirer 116. The acquirer 116 sends the authorization response message to the merchant 112. A printer (not shown) at the merchant 112 may then print a receipt showing only the last four digits of the secured account number, e.g., ***********1214. As noted above, since the last four digits are the same for both the secured account number and the user's real account number, the user is unaware of any account number differences between the secured account number and the user's real account number. While four digits are illustrated, one skilled in the art will recognize that any alphanumeric indicator, symbol, or indicia, common to both the secured account number and the user's real account number may be used within the scope of the present invention. For example, in some embodiments, the secured account number and the real account number may have two or more common numbers.

Two software engines are illustrated in FIG. 1. They include a secured account engine 122 and an optional fraud detection engine 124. Various other software engines may also be included in the system to perform the methods according to embodiments of the invention. Although the two software engines 122, 124 are shown as being directly accessible to the payment processing system 120, they may also or alternatively be directly accessible to the proximity reader device 110, the merchant 112, the acquirer 116, and the issuer 130. The secured account engine 122 is preferably directly accessible or within the payment processing system 120. If the secured account number is converted at the payment processing system 120, the payment processing system 120 will be able to route the authorization request message to the appropriate issuer 130. In addition, if the software for converting the secured account number into the real account number is at the payment processing system 120, expensive equipment upgrades need not occur at the acquirer 116 or merchant 112.

When a secured account number is received by the secured account engine 122, the secured account engine 122 converts the secured account number to the user's real account number. In one embodiment, the secured account engine 122 compares the secured account number to a plurality of secured account numbers to find the user's real account number (e.g., in a lookup table). Alternatively, one or more algorithms may be operated to convert the secured account number to the user's real account number. A suitable algorithm may be the reverse program of the algorithm used to convert the real account number to the secured account number (as described above).

If the payment processing system 120 receives an authorization request message including a secured account number that does not have the transaction type identifier (e.g., POS 91), or other indicator, indicating a proximity transaction, then the optional fraud detection engine 124 may be capable of one or more proactive and non-proactive responses. For example, one non-proactive response is simply to deny the transaction. An authorization response message may be sent from the issuer 130 to the merchant 112 that indicates that the transaction is not authorized. One example of a proactive response is to alert legal authorities that a fraudulent activity is taking place. In one embodiment, when the secured account number is received by the payment processing system 120 without the POS proximity transaction indicator, then the issuer 130 is notified. The issuer 130 checks the user's real account for unusual activity (e.g., large purchases when a consumer usually does not make large purchases). If unusual activity is detected, then the payment processing system 120 and/or the issuer 130 may suspend the secured account number until verification is made that the secured account number was not stolen. In this case, the use of the secured account number and/or the real account number can be temporarily suspended pending an investigation. If it is determined that the user's secured account number was obtained and used by an unauthorized person, then the payment processing system 120 may reissue a new portable proximity consumer device to the real user. For example, similar to conventional procedures for lost or stolen account numbers, part of the verification process may be for the payment processing system 120 to issue an alert to the merchant 112 to keep the portable proximity consumer device 102, or to have the user contact the issuer 130 to verify the unauthorized transaction.

Figure 2:
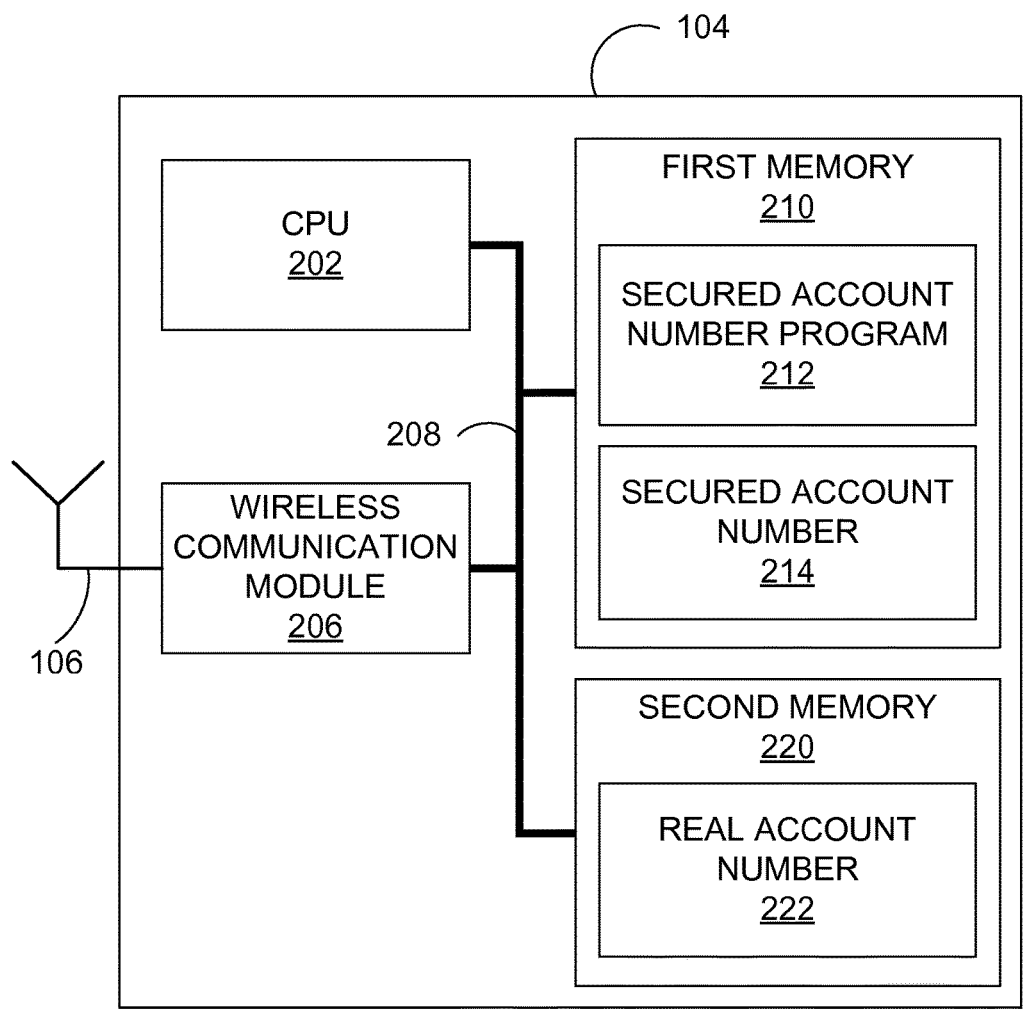
FIG. 2 is a high-level block diagram illustrating one embodiment of a data processing circuit for a portable proximity consumer device in accordance with embodiments of the invention.

FIG. 2 is a high-level block diagram illustrating one embodiment of a data processing circuit 104 for use with a portable proximity consumer device 102. The data processing circuit 104 may be virtually any type of integrated circuit and/or data processing system such as a microprocessor, field programmable gate array (FPGA), application specific integrated circuit (ASIC), and the like, that may be configured to perform embodiments of the present invention to advantage. In one embodiment, data processing circuit 104 includes a Central Processing Unit (CPU) 202, a wireless communication module or transceiver circuit 206, and a first memory 210, and an optional second memory 220 in communication therewith via a bus 208. CPU 202 may be under the control of an operating system that may be disposed in first memory 210. Virtually any operating system or portion thereof supporting the configuration functions disclosed herein may be used. In one embodiment, CPU 202 may be hardwired logic circuitry, and the like, adapted to operate data processing circuit 104.

The wireless communication module 206 may be designed to receive wireless interrogation signals and transmit communication signals to the proximity reader device 110 via the wireless transmission module 106. Any number of wireless communication devices well known in the art may be used to accomplish the reception and transmission of data between the proximity reader device 110 and the portable proximity consumer device 102. For example, the wireless communication module 206 may be formed from a wireless receiver in combination with a wireless transmitter. The wireless communication module 206 may use any viable communication link such as ISO 14443, Bluetooth, 802.11x, cellular network, RF, and the like. In other words, virtually any wireless transceiver system that is sized accordingly and capable of communicating with contactless reader 110 may be used.

The first memory 210 can be a non-volatile or volatile memory such as a random access memory that has sufficient space to hold the necessary programming and data structures of the invention. While first memory 210 is shown as a single entity, it should be understood that first memory 210 may in fact comprise a plurality of modules, and that first memory 210 may exist at multiple levels, from high speed registers and caches to lower speed but larger direct random access memory (DRAM) chips. In one embodiment, first memory 210 may include a secured account program 212 and secured account number storage 214. The secured account program 212 may use any one of a number of different programming languages. For example, the program code can be written in PLC code (e.g., ladder logic), a higher-level language such as C, C++, Java, or a number of other languages. While secured account program 212 may be a standalone program, it is contemplated that secured account program 212 may be combined with other programs.

The secured account program 212 when executed on CPU 202, provides a secured account number to the proximity reader device 110 from the secured account number storage 214. In one embodiment, the secured account program 212 is configured to retrieve a secured account number from the secured account storage 214. The secured account program 212 instructs the CPU 202 to wirelessly transmit the secured account number, among other data such as available credit, user data, and the like, to the proximity reader device 110 via the wireless communication module 206.

In one embodiment, data processing circuit 104 may optionally include a second memory 220. The second memory 220 is capable of storing the user's real account number in a real account number storage 222. Preferably, in the case were data processing circuit 104 stores both the secured account number and the user's real account number, the user's real account number is accessible only via a physical contact connection. For example, the user's real account number may be accessed via an electrical connection with data processing circuit 104. In an alternate embodiment, similar to conventional credit/debit cards the user's real account number may be encoded onto the magnetic stripe 108. In this configuration, the user's real account number is accessible using conventional contact readers 114 capable of reading magnetic stripes.

In preferred embodiments, the first and second memories use different data storage technologies. For example, the first and second memories may be selected from optical, magnetic, or electronic storage media, and may be different. For example, the first memory may be use an electronic storage medium (e.g., a memory chip), while the second memory may use a magnetic storage medium (e.g., a magnetic stripe 108).

Figure 3:
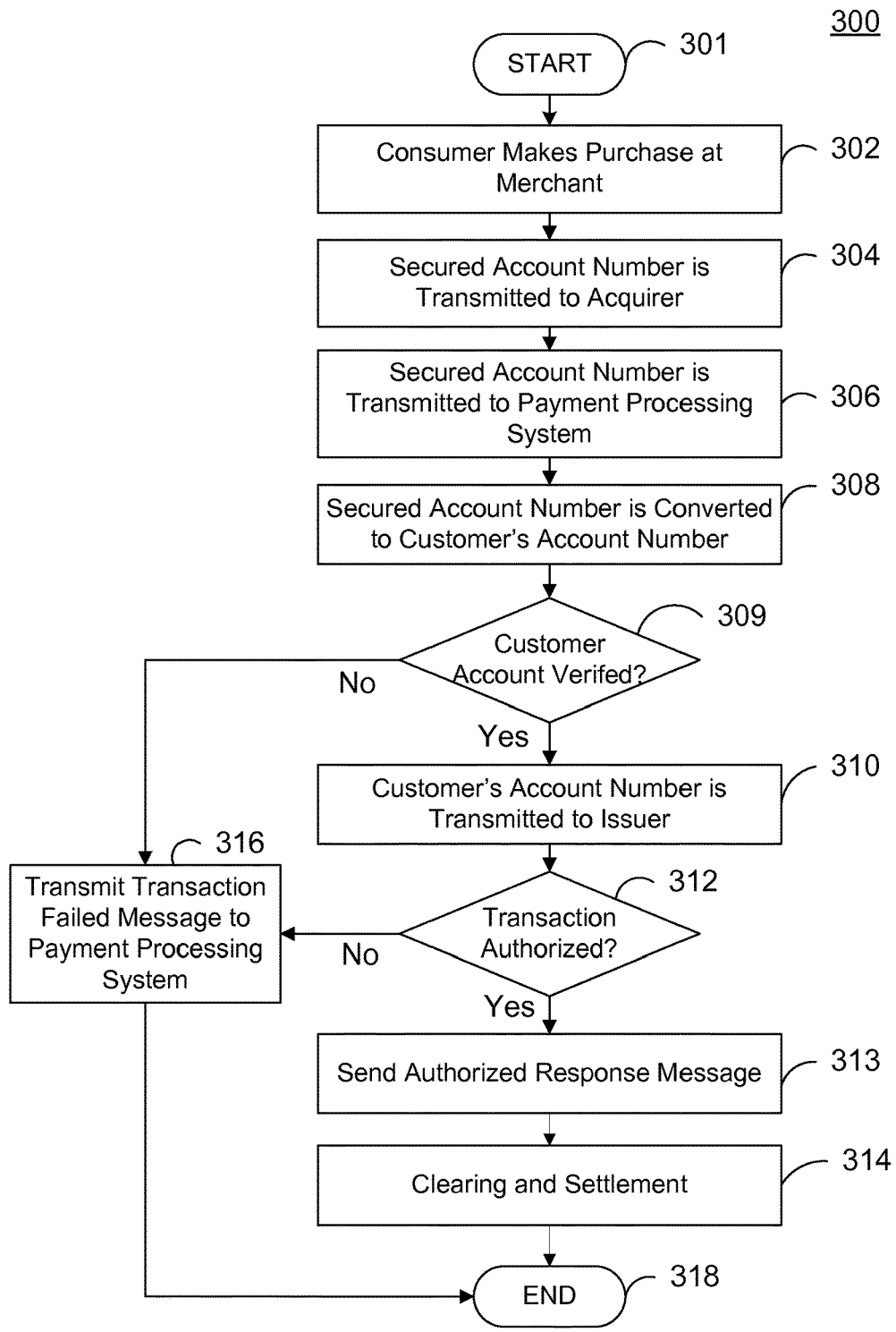
FIG. 3 is a high-level flow diagram illustrating one embodiment of a method of performing a secured account number transaction process in accordance with embodiments of the invention.

FIG. 3 is a high-level flow diagram illustrating one embodiment of a method 300 of performing a secured account number transaction process. The method 300 may be entered into at step 301 when, for example, a proximity reader device 110 wirelessly interrogates a portable proximity consumer device 102. At step 302, a user initiates the creation of an authorization request message to, for example, purchase goods or services from a merchant 112 (e.g., the user is attempting to purchase a piece of clothing using the portable proximity consumer device 102), by passing the portable proximity consumer device 102 close to the proximity reader device 110. The proximity reader device 110 wirelessly interrogates the portable proximity consumer device 102. At step 304, the portable proximity consumer device 102 responds to valid interrogation protocols (e.g., fetch account number instructions, fetch user ID instructions, etc.) by wirelessly transmitting information to the proximity reader device 110. The information may include a secured account number along with other data, such as an expiration date of the user's account. The proximity reader device 110 then creates an authorization request message including the secured account number, merchant ID, POS transaction type identifier, and the purchase amount, and it is transmitted from the merchant 112 to the acquirer 116 at step 304. For example, the merchant 112 may transmit the secured account number, the merchant ID, the POS transaction type, the user's identification, the expiration date, and the like to the acquirer 116. At step 306, the acquirer 116 transmits the information received from the acquirer 116 to the payment processing system 120.

At step 308, the secured account number is converted to the user's real account number. For example, as described above, when a secured account number is received by the payment processing system 120, a secured account engine 122 converts the secured account number to the user's real account number. In one embodiment, the secured account engine 122 may search a database of secured account numbers to find the user's real account number. Alternatively, a conversion algorithm may be used to convert the secured account number to the user's real account number.

If the real account number is not found, at step 309, the method 300 proceeds to step 316 and, for example, issues a transaction invalid protocol to the payment processing system 120. For example, if the real account number is not found, the payment processing system 120 may alert the issuer 130, the acquirer 116, and/or the merchant 112 that the transaction is not authorized. Conceivably, after attempting to use the contactless authorization, the user, being unaware of the secured account number, may reattempt the transaction using the user's real account number via entry by an operator or by using a contact reader 114.

At step 310, if the secured account number is valid, the authorization request message including the user's real account number, the merchant ID, the POS transaction type, and the purchase amount along with other transaction data to the issuer 130. For example, the payment processing system 120 may transmit the user's real account number, the secured account number, and the POS transaction type, along with other transaction data to the issuer 130. At step 312 if the transaction is not authorized, e.g. the user does not have sufficient credit for the purchase, the method 300 proceeds to step 316. However, if the transaction is authorized, e.g., the issuer 130 has authorized the transaction, the method 300 proceeds to step 313. Then at step 313, an authorization response message is sent to the merchant 112 informing the merchant 112 and the user whether or not the transaction is authorized. At step 314, the transaction is cleared and settled using conventional procedures. For example, at the end of the day, a normal clearing and settlement process can take place at step 314. At step 318 the method 300 ends.

Figure 4:
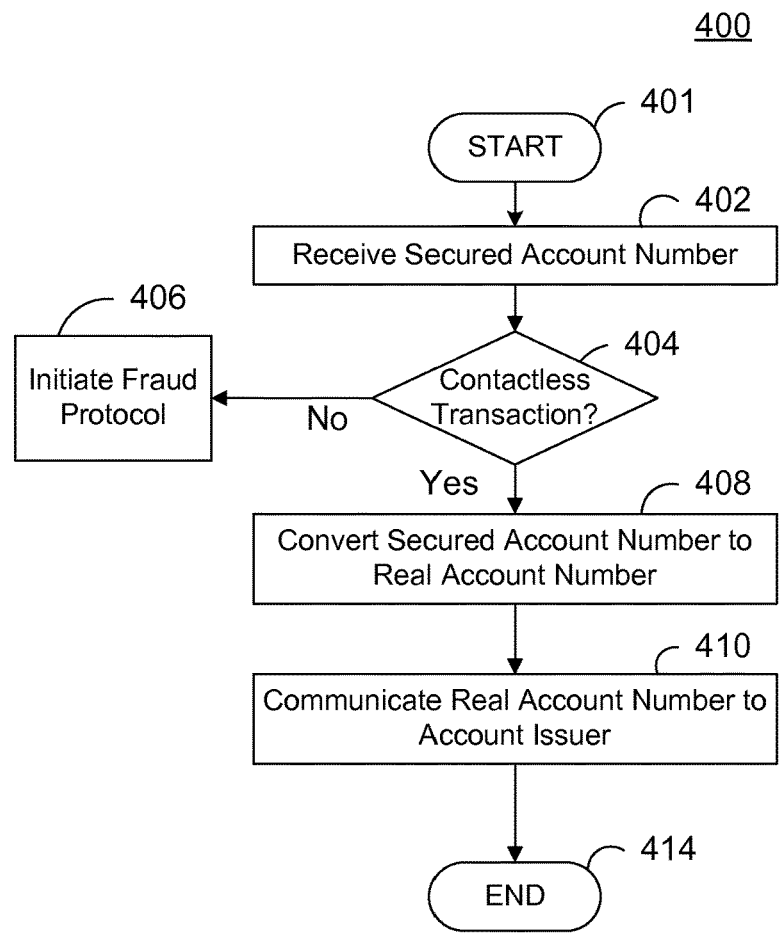
FIG. 4 is a high-level flow diagram illustrating one embodiment of a method of performing a transaction process involving a wireless based transmission of a secured account number from a portable proximity consumer device to a proximity device reader in accordance with embodiments of the invention.

FIG. 4 is a high-level flow diagram illustrating one embodiment of a method 400 of performing a financial transaction involving a secured account number. The method 400 may be entered into at step 401 when, for example, when a merchant 112 transmits a purchase authorization request to a payment processing system 120. At step 402, a secured account number is received. For example, a payment processing system 120 receives a secured account number and POS transaction type from an acquirer 116. At step 404, the method 400 determines if the secured account number was received from a portable proximity consumer device 102 wirelessly communicating with a proximity reader device 110. In one embodiment, the method 400 uses a POS transaction type identifier to determine if the secured account number was received either using a proximity transaction, or was received via another means, such as an Internet merchant portal, or by hand entry into terminal of a proximity reader device 110 or a contact reader 114, and the like. If the secured account number was not received via a proximity reader device 110, then the method 400 proceeds to step 406 and initiates a fraud protocol. For example, the fraud protocol may be used for tracking the transaction by authorities, instructing the payment processing system 120 to deny the transaction, and/or sending a status report to the issuer indicative of the fact that the secured account number has been acquired by unauthorized users. If at step 404 the method 400 determines that the secured account number and the POS transaction type are correct, the method 400 proceeds to step 408. The method 400 converts the secured account number to the user's real account number at step 408. For example, the payment processing system 120 may perform algorithms to convert the secured account number to the user's real account number some of which are described herein. At step 410 the user's real account number and other verification data such as expiration date and customer identification are transmitted to an issuer 130 for authorization. Optionally, at step 410 the secured account number is also transmitted to the issuer 130. The method 400 ends at step 414.

The method shown in FIG. 4 may be combined with any of the steps in the method shown in FIG. 3. The method may also be conducted by the secured account engine 122, the payment processing system 120, or any other suitable entity.

Any of the above described steps may be embodied as computer code on a computer readable medium. The computer readable medium may reside on one or more computational apparatuses and may use any suitable data storage technology.

The present invention can be implemented in the form of control logic in software or hardware or a combination of both. The control logic may be stored in an information storage medium as a plurality of instructions adapted to direct an information processing device to perform a set of steps disclosed in embodiment of the present invention. Based on the disclosure and teachings provided herein, a person of ordinary skill in the art will appreciate other ways and/or methods to implement the present invention.

The above description is illustrative but not restrictive. Many variations of the invention will become apparent to those skilled in the art upon review of the disclosure. The scope of the invention should, therefore, be determined not with reference to the above description, but instead should be determined with reference to the pending claims along with their full scope or equivalents.

A recitation of "a", "an" or "the" is intended to mean "one or more" unless specifically indicated to the contrary.

All patents, patent applications, publications, and descriptions mentioned above are herein incorporated by reference in their entirety for all purposes. None is admitted to be prior art.

What is claimed is:

1. A portable consumer device comprising:
a processor;
a wireless transmission module;
one or more storage elements for storing a real account number and a secured account number associated with the real account number, the secured account number and the real account number being associated with the same account,
wherein when the portable consumer device is interacting with a point-of-sale terminal to conduct a transaction, the portable consumer device:
determines whether the transaction is a proximity transaction by sensing whether a wireless interrogation signal is being transmitted from the point-of-sale terminal;
determines which of the real account number and the secured account number stored on the portable consumer device to provide to the point-of-sale terminal based on whether the transaction is a proximity transaction;
when the transaction is a proximity transaction, operates in a proximity mode by wirelessly transmitting the secured account number instead of the real account number to the point-of-sale terminal via the wireless transmission module; and
when the transaction is not a proximity transaction, operates in a non-proximity mode by providing the real account number stored in a magnetic stripe to the point-of-sale-terminal,
wherein non-proximity transactions conducted using the secured account number are denied.

2. The portable consumer device of claim 1, wherein the secured account number is dedicated for use in proximity transactions.

3. The portable consumer device of claim 1, wherein the one or more storage elements includes a first storage element and a second storage element that uses a different data storage technology than the first storage element.

4. The portable consumer device of claim 1, wherein the one or more storage elements includes the magnetic stripe for storing the real account number.

5. The portable consumer device of claim 1, wherein the one or more storage elements include a memory accessible by the processor for storing at least the secured account number.

6. The portable consumer device of claim 1, wherein the portable consumer device is in the form of a card.

7. The portable consumer device of claim 1, wherein a last plurality of digits of the secured account number is the same as the last plurality of digits of the real account number.

8. The portable consumer device of claim 1, wherein the secured account number has a different length than the real account number.

9. The portable consumer device of claim 1, wherein the secured account number and the real account number include a predetermined sequence of characters that is common to both the secured account number and the real account number.

10. The portable consumer device of claim 1, wherein the secured account number is preloaded onto the portable consumer device.

11. A method for conducting a transaction by a portable consumer device, the method comprising:
interacting with a point-of-sale terminal to conduct the transaction by the portable consumer device, the portable consumer device including a processor and one or more storage elements for storing a real account number and a secured account number associated with the real account number, the secured account number and the real account number being associated with the same account;
determining, by the portable consumer device, whether the transaction is a proximity transaction by sensing whether a wireless interrogation signal is being transmitted from the point-of-sale terminal;
determining which of the real account number and the secured account number stored on the portable consumer device to provide to the point-of-sale terminal based on whether the transaction is a proximity transaction;
when the transaction is a proximity transaction, operating the portable consumer device in a proximity mode by wirelessly transmitting the secured account number instead of the real account number to the point-of-sale terminal; and
when the transaction is not a proximity transaction, operating the portable consumer device in a non-proximity mode by providing the real account number stored in a magnetic stripe to the point-of-sale terminal,
wherein non-proximity transactions conducted using the secured account number are denied.

12. The method of claim 11, wherein the secured account number is dedicated for use in proximity transactions.

13. The method of claim 11, wherein the real account number is dedicated for use in contact transactions or in direct entry transactions.

14. The method of claim 11, wherein the one or more storage elements includes the magnetic stripe for storing the real account number.

15. The method of claim 11, wherein the one or more storage elements include a memory accessible by the processor for storing at least the secured account number.

16. The method of claim 11, wherein the real account number is a user's credit card account number, bank account number, or debit card account number.

17. The method of claim 11, wherein an authorization request message generated in response to the interaction between the point-of-sale terminal and the portable consumer device includes a transaction type identifier indicating whether the transaction is a proximity transaction.

18. The method of claim 11, wherein a last plurality of digits of the secured account number is the same as the last plurality of digits of the real account number.

19. The method of claim 11, wherein the secured account number has a different length than the real account number.

20. The method of claim 11, wherein the secured account number and the real account number include a predetermined sequence of characters that is common to both the secured account number and the real account number.

\* \* \* \* \*